(12) United States Patent
Anderson (10) Patent No.: US 7,552,556 B2
(45) Date of Patent: Jun. 30, 2009

(54) SLIM COMPACT DISK MEDIA CASE SPINE LABEL APPARATUS AND METHOD

(76) Inventor: Steven J. Anderson, 2036 Careleon Rd., Schenectady, NY (US) 12303

( * ) Notice: Subject to any disclaimer, the term of this patent is extended or adjusted under 35 U.S.C. 154(b) by 94 days.

(21) Appl. No.: 11/383,351

(22) Filed: May 15, 2006

(65) Prior Publication Data

US 2007/0261283 A1 Nov. 15, 2007

(51) Int. Cl.
*G09F 3/10* (2006.01)
(52) U.S. Cl. .................................................. 40/638
(58) Field of Classification Search .................. 40/638, 40/594, 630, 595
See application file for complete search history.

(56) References Cited

U.S. PATENT DOCUMENTS

| | | | | |
|---|---|---|---|---|
| 4,317,852 A | * | 3/1982 | Ogden | 428/40.1 |
| 4,972,615 A | * | 11/1990 | Grant | 40/641 |
| 5,227,209 A | * | 7/1993 | Garland | 428/42.1 |
| 5,279,058 A | * | 1/1994 | Kohn | 40/638 |
| 5,955,166 A | * | 9/1999 | Murphy | 428/40.1 |
| 6,176,958 B1 | * | 1/2001 | Shea | 156/253 |
| 6,367,183 B1 | * | 4/2002 | Haber | 40/594 |
| 6,649,238 B2 | * | 11/2003 | Chess et al. | 428/40.1 |
| 7,097,893 B2 | * | 8/2006 | McCarthy et al. | 428/43 |

FOREIGN PATENT DOCUMENTS

FR 2687493 A1 * 8/1993

* cited by examiner

*Primary Examiner*—Gary C Hoge
(74) *Attorney, Agent, or Firm*—Schmeiser, Olsen & Watts (57) ABSTRACT

A slim compact disk media case spine label apparatus is provided, the apparatus comprising a backing, an adhesive operatively adhered to the backing, and a face bonded to the adhesive, wherein a first portion of the face is removable from the adhesive and a second portion of the face is preconfigured to fit substantially precisely against a spine of a slim compact disk media case. Also provided are related methods of labeling a spine of a slim compact disk media case and methods of manufacturing a label apparatus to be preconfigured for use in conjunction with a slim compact disk media case spine.

14 Claims, 5 Drawing Sheets

SLIM COMPACT DISK MEDIA CASE SPINE LABEL APPARATUS AND METHOD

BACKGROUND OF INVENTION

1. Technical Field

This invention relates generally to the field of labels. More particularly, this invention provides for an apparatus and method for labeling a spine of a slim compact disk media case.

2. Related Art

As digital media has increased in popularity and usage, there has been a corresponding increase of demand for durable compact physical storage of digital media and efficient portability of digital media storage devices. Presently, a very commonly used portable digital media storage device is a compact laser disk. Various compact laser disks types may have physical differences and may be identified by various nomenclatures such as an Audio CD, a CD-ROM, a DVD, a CD-R, a CD-RW, a DVD-R and/or a DVD-RW, etc. However, in general, most compact laser disks are comprised of a durable, semi-resilient, clear plastic material having at least a layer of reflective material. Furthermore, most compact laser disks are provided in standardized sizes. A very common standardized size corresponds to a compact disk having a diameter of approximately 120 mm and a thickness of approximately 1.2 mm.

Because most compact laser disks rely on optically detectable data storage and retrieval, it is essential that the disks be maintained in a condition that permits effective optical operation of the compact laser disk. For example, if a compact laser disk is scratched or contaminated, then data may not effectively be optically stored or retrieved in the location of the scratch or contamination. Therefore, devices have been provided to keep a compact laser disk protected while the disk is stored or transported. A common protection device is a CD case, or jewel case.

In addition to protecting a compact laser disk, a CD case, or jewel case, also facilitates a means by which the data stored on the compact laser disk may be labeled and identified. For example, information about the data stored on the compact laser disk may be printed or written on an insert visually operable with the CD case such that the information on the insert can be readily seen and ascertained while the case houses the compact laser disk. Furthermore, due to the geometry of the compact laser disk and corresponding geometry of a typical CD case it is possible to stack several cases on top of each other, or stand several cases next to each other. When arranged in such a manner, only a thin edge of each of the several cases may be visually accessible. Hence, CD case inserts have been fashioned to have a portion of the insert located along or against a clear edge of the CD case. Ordinarily, a CD case includes hinged members to facilitate a book-like opening and closing of the case for physical deposit and/or retrieval of a compact laser disk therein. Moreover, the edge of the CD case typically spanning the distance between two hinges is often referred to as the "spine" of the CD case. This edge of a typical CD case is generally analogous to the back edge or spine of a book. Just as books may be shelved or stored such that only the spines are visible, CD cases are often shelved or stored in a similar manner so that only the spines of the cases are substantially visible. Accordingly labels have been provided to attach to the spines of CD cases so that the cases, and corresponding compact laser disks housed therein, may be efficiently identified when the cases are stacked or shelved with only the spines visible.

A shortcoming of standard CD cases, or jewel cases, is the thickness of the cases. Typically a common CD case is much thicker than the compact laser disk housed therein. However, to overcome this shortcoming, CD cases having substantially smaller thicknesses have been provided; these slimmer compact disk media cases are commonly known as "slim" CD cases. Like ordinary CD cases, slim CD cases can be fit with inserts to help in identifying the data stored on the compact laser disk housed by the slim CD case. However, because slim CD cases are thinner, the edges and spine have much less surface area. This lack of surface area, inter alia, has contributed to a problem of not being able to effectively label the spine area of the slim CD cases due to the lack of space or surface area typically operable with an ordinary spine label. Furthermore, the smaller surface area reduces the ability to effectively and/or efficiently mount an ordinary spine label to the slim CD case because the ordinary spine label is much larger than the surface area operable for mounting/attaching the label. No label apparatus is preconfigured to dimensionally correspond with the spine of a slim CD case. Hence, to utilize the spine of a slim CD case for identifying the data stored on a compact laser disk housed by the slim CD case, common label devices must be physically altered to achieve a configuration corresponding to the dimensions of the spine of a slim CD case and the typical labeling process must be awkwardly modified to include the necessary reconfiguration. For example, paper or other material must be cut and somehow glued or otherwise inconveniently attached to the spine of a slim CD case. Tape products must also be cut and similarly somehow inconveniently attached to the spine of a slim CD case. Furthermore, known label devices must be cut as well and further physically altered in order to be effectively attached to the spine of a slim CD case. Therefore, the present necessity to reconfigure, alter, cut, and modify existing label devices, paper, or tape products, is time intensive, tiresome and wasteful.

Accordingly, there is a need in the field of labeling the spines of slim CD cases for an improved slim compact disk media label apparatus and method.

SUMMARY OF INVENTION

The present invention provides a slim compact disk media label apparatus and method that offers improved reliability.

A first general aspect of the invention provides a slim compact disk media case spine label apparatus comprising: a backing, an adhesive, operatively adhered to the backing, and a face, bonded to the adhesive, wherein a first portion of the face is removable from the adhesive and a second portion of the face is preconfigured to fit substantially precisely against a spine of a slim compact disk media case.

A second general aspect of the invention provides a method of labeling a spine of a slim compact disk media case, said method comprising: providing a slim compact disk media case spine label apparatus comprising a backing, an adhesive, operatively adhered to the backing, and a face, bonded to the adhesive wherein a first portion of the face is removable from the adhesive and a second portion of the face is preconfigured to fit substantially precisely against a spine of a slim compact disk media case; bending a portion of the backing along a line corresponding to an edge between the first portion of the face and the second portion of the face so that the bend reaches approximately a 90 degree angle; removing the first removable portion to expose the adhesive, and leaving said second portion of said face operably attached to said bent portion of said backing; and operatively affixing the exposed adhesive against a portion of the slim compact disk media case so that the second portion of the face substantially precisely fits against the spine of the slim compact disk media case.

A third general aspect of the invention provides a method of manufacturing a label apparatus to be preconfigured for use in conjunction with a slim compact disk media case spine, said method comprising: providing a backing, affixing an adhesive to the backing, and operatively attaching a face to the backing so that the adhesive is sandwiched between the face and the backing, wherein the face includes a first removable portion and is cut along a line between the first removable portion and a second portion, said backing configured to be bent at the line between the first portion and second portion to approximately a 90 degree angle, and further wherein the second portion of the face dimensionally corresponds to a spine of a slim compact disk media case.

The foregoing and other features of the invention will be apparent from the following more particular description of various embodiments of the invention.

BRIEF DESCRIPTION OF THE DRAWINGS

Some of the embodiments of this invention will be described in detail, with reference to the following figures, wherein like designations denote like members, wherein.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

"Preconfigured," as used herein, means a slim compact disk media label apparatus is designed, arranged, set up, or shaped with a view toward a specific application corresponding with attachment of the slim compact disk media label apparatus to a slim CD case for use in identifying data stored on a compact disk intended to be housed within the case, wherein such designing, arranging, setting up, or shaping is performed during an original manufacturing process to configure structure of a raw component for proper use, as opposed to altering, cutting and/or modifying an existing apparatus to reconfigure the existing apparatus's original structure to compensate for previously unachievable effective function of the existing apparatus in conjunction with a slim CD case.

Figure 1:
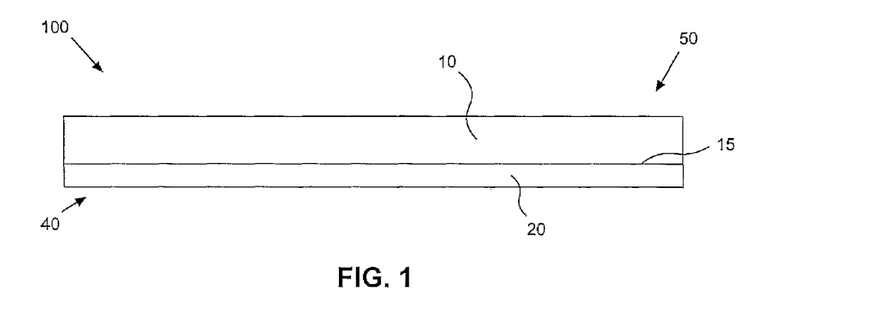
FIG. 1 depicts a top view of an embodiment of a slim compact disk media label apparatus, in accordance with the present invention.

Referring to the drawings, FIG. 1 depicts a top view of an embodiment of a slim compact disk media label apparatus 100, in accordance with the present invention. Generally, the label apparatus, as originally provided, may be a substantially rectangular approximately two-dimensional shape having exterior perimeter dimensions of 4⅝" by ½". Moreover, the label apparatus 100 may include a backing 50 (numerated with an arrow to emphasize that the backing is not visible in the view corresponding to FIG. 1). Covering the backing, and possibly removably affixed or bonded thereto with an adhesive 30 (shown in FIG. 2) may be a face 40 (also indicated with an arrow to emphasize the possibility that the face 40 may be comprised of multiple component elements). As such, the face 40 may include a removable first portion 10. The first portion 10 may be separated from a second portion 20 along a line 15 defining a cut, a skewer, an approximately linear perforation boundary, and/or a visual marking.

Figure 2:
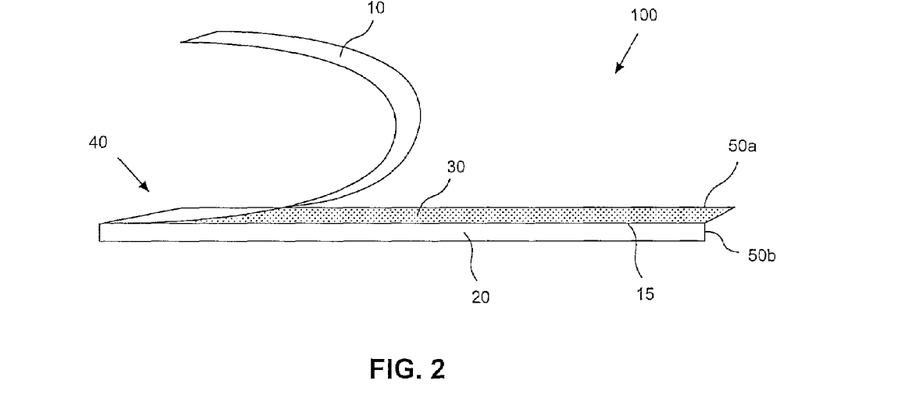
FIG. 2 depicts a perspective view of an embodiment of a slim compact disk media label apparatus having a first portion of the face removed with the adhesive exposed on a portion of the backing and another second portion of the face operably located on a downward bent portion of the backing, in accordance with the present invention.

Referring further to the drawings, FIG. 2 depicts a perspective view of an embodiment of a slim compact disk media label apparatus 100 having a first portion 10 of the face 40 removed with the adhesive 30 exposed on a portion of the backing 50a and another second portion 20 of the face 40 operably located on a downward bent portion of the backing 50b, in accordance with the present invention. Accordingly, various component elements of the label apparatus 100 may be comprised of somewhat resilient material. For example, various components of various embodiments of the label apparatus 100 may be comprised of paper products, wherein the paper products may be able to bend and fold. Moreover, various components of the label apparatus may be comprised of polymeric materials, thin metal materials, and/or textile materials also having capacity to bend and fold. However, while various components of various embodiments of the label apparatus may be flexible, the various components may also be durable and able to resist tearing, ripping, breaking, sloughing, bubbling, melting and/or other degrading activities to a functionally acceptable degree of performance. Furthermore, the various materials comprising various embodiments of a label apparatus 100 may be different colors. For instance, different colors may coordinate with different data categories, CD types, genres of information and/or stylistic preferences. Still further, embodiments of the label apparatus 100 may readily accept and efficiently retain deposited materials such as ink, graphite, way crayon, paint (oil, acrylic or latex), glitters, metallic substances, glues, toner ink and other like materials. Hence, embodiments of the label apparatus 100 may be utilized to display information depicted graphically, pictorially and/or alphanumerically by materials deposited on the label apparatus 100. As such, various materials of embodiments of the label apparatus should be readily receive and retain printed ink or handwritten ink.

Referring further to FIG. 2, an embodiment of a slim compact disk media case spine label apparatus 100 may include a face 40 having a first portion 10. The first portion 10 may be removably bonded to an adhesive 30 operatively affixed to a portion of the backing 50a. The removable first portion 10 of the face 40 may be referred to as the 'peel strip' in that the first portion 10 may peel off of the adhesive 30 affixed to the backing 50. Moreover, the peelable first portion 10 may be substantially rectangular having 4⅝" by 11/32" dimensions. Furthermore, the removable first portion 10 may have a readily printable area. For example, directives or instructions on how to use and apply the label apparatus 100 to a slim CD case (shown in FIGS. 3-4 and 8) may be printed on the peel strip 10. The directives or instructions may printed on the peel strip 10 may include steps such as: 1) Write in the space below (the space below referring to the second portion 20 of the face 40); 2) Bend label over; 3) Peel this top section off; and 4) Stick under CD spine. In addition, a separate instruction sheet with graphical illustrations may also be provided with embodiments of a label apparatus 100 to help direct a user how to possibly attach the apparatus 100 to a slim CD case spine.

Figure 3:
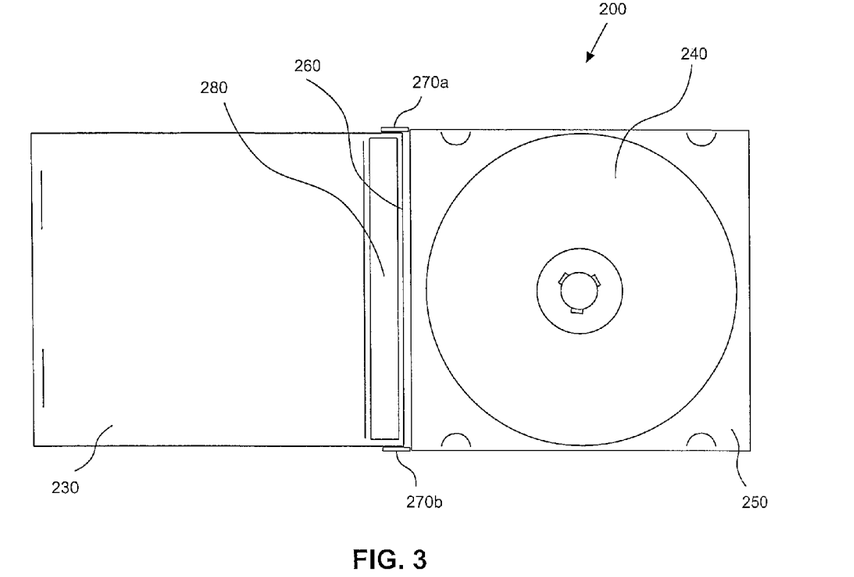
FIG. 3 depicts a top view of an embodiment of an open slim CD case, in accordance with the present invention.
Figure 4:
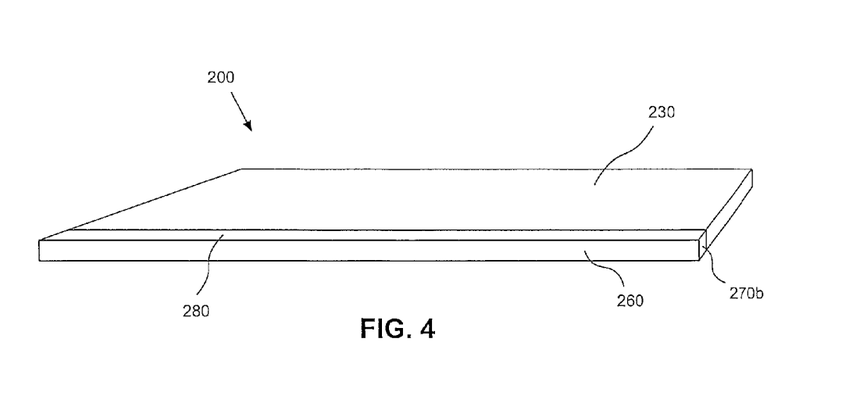
FIG. 4 depicts a perspective view of an embodiment of a closed slim CD case, in accordance with the present invention.
Figure 5:
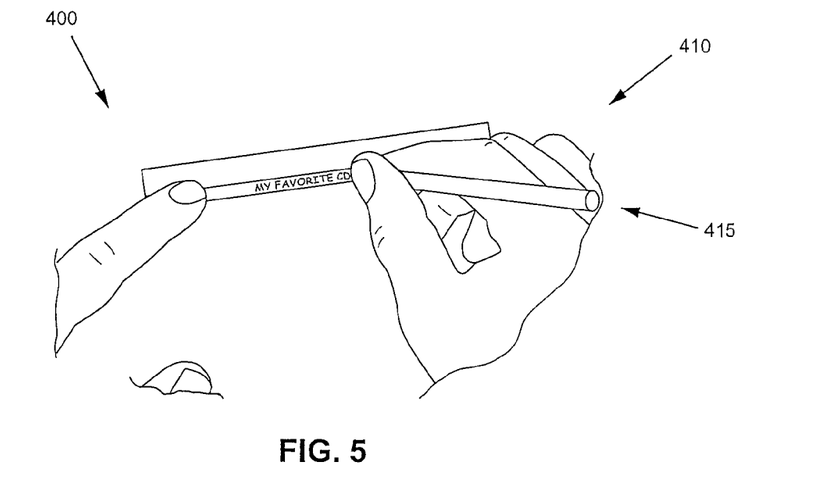
FIG. 5 depicts a perspective view of an embodiment of a slim compact disk media label apparatus being written on, in accordance with the present invention.
Figure 6:
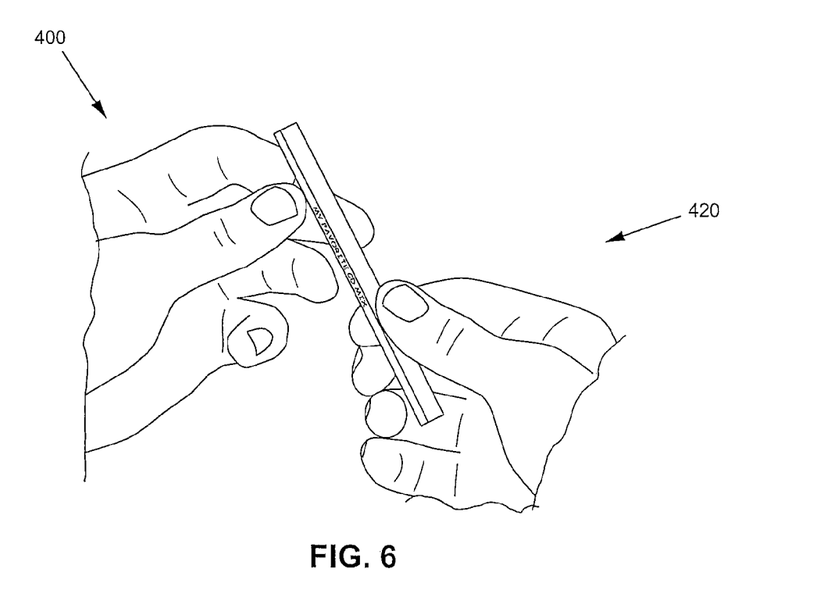
FIG. 6 depicts a perspective view of an embodiment of a slim compact disk media label apparatus after being written on, in accordance with the present invention.
Figure 7:
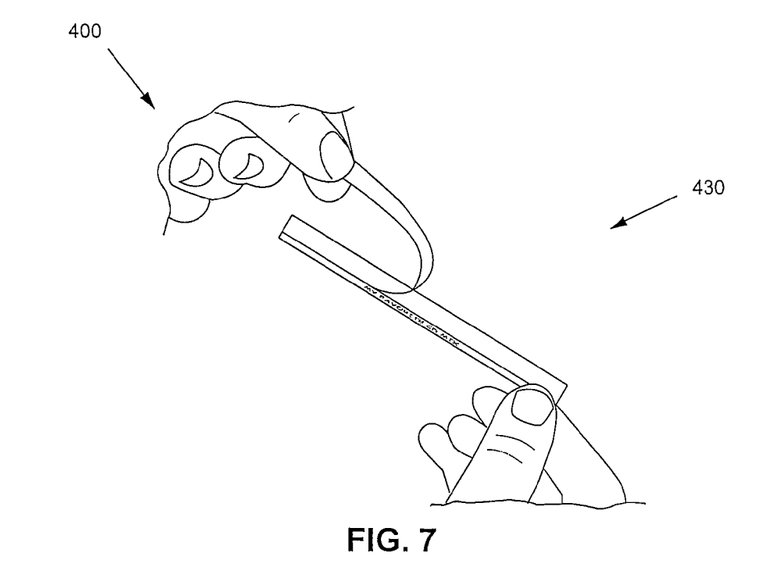
FIG. 7 depicts a perspective view of an embodiment of a slim compact disk media label apparatus having a portion of the face being removed, in accordance with the present invention.
Figure 8:
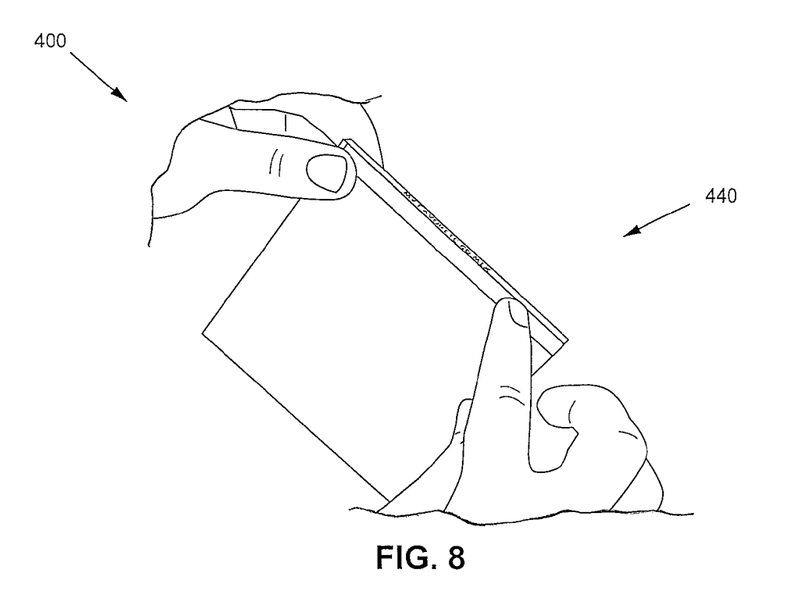
FIG. 8 depicts a perspective view of an embodiment of a slim compact disk media label apparatus being attached to a slim CD case, in accordance with the present invention.

Referring further still to FIG. 2, the second portion 20 of the face 40 of the label apparatus 100 may also include identifying means possibly corresponding to the identity of data stored on a compact disk intended to be housed by the slim compact disk media case(such as case 200 shown in FIGS. 3-4 and 8). The identifying means may be printed ink, handwritten writing or other similar visual indicators capable of being deposited on the second portion 20 of the face 40. Hence, the area that may be written or printed on may be referred to as the 'written' area. Furthermore, the second portion 20 of the face 40 may be substantially rectangular having 4⅝" by 5/32" dimensions. In particular, the dimension of the second portion 20 of the face 40 may substantially correspond to the dimensions if a slim CD case spine. Thus the second portion 20 may be preconfigured to fit substantially precisely against a spine of a slim compact disk media case.

With continued reference to FIG. 2 and additional reference to FIG. 1, an embodiment of a slim compact disk media case spine label apparatus 100 may include a backing 50 that may facilitate structural support for the entire label apparatus 100. As such the backing 50 may correspond to the overall dimensions of the label apparatus 100 and thus may be substantially rectangular having 4⅝" by ½" dimensions. An entire surface of the backing 50 may have adhesive 30 bonded thereto. However, those in the art should recognize that the adhesive 30 may be applied to the backing 50 in patterns or randomly and not cover the entire surface area of the backing 50. When removable portion 10 of face 40 is peeled off, then a portion 50a of the backing may be exposed along with the adhesive 30 affixed thereto. Moreover, the backing may be configured to bend and operate with the second portion 20 of the face 40. For example, embodiments of the label apparatus 100 may operatively attach a face 40 to the backing 50 so that the adhesive 30 is sandwiched between the face 40 and the backing 50, wherein the face 40 includes a first removable portion 10 and is cut along a line 15 between the first removable portion 10 and a second portion 20, said backing 50 configured to be bent at the line 15 between the first portion 10 and second portion 20 to approximately a 90 degree angle, and further wherein the second portion 20 of the face dimensionally corresponds to a spine 260 of a slim compact disk media case 200 (shown in FIGS. 3-4). Still further, cuts, perforations, pre-folded ribs or edges and/or other like implements may be provided on and/or with the backing 50 to facilitate bending; although such implements are not necessarily needed on the are that is to be bent over (that is the edge where the 'written area' meets the 'peel strip'). The split in the paper due to the edge of the peel strip already may makes for an easier bend point. However, with heavier cardstock-type paper, a pre-folded edge may be desirable for easier bending.

In continued reference to the drawings, FIG. 3-4 depicts a top view of an embodiment of an open slim CD case 200 and a perspective view of the embodiment of a slim CD case being respectively closed, in accordance with the present invention. The slim CD case 200 may include a CD retaining area 240 wherein compact disks may be located when housed by the CD case 200. The CD retaining area 240 may be seated in a base portion 250 of the slim CD case 200. Moreover, the slim CD case 200 may include a cover 230 operating as a lid-like hatch in conjunction with hinges 270a-b to close-off and enclose a compact disk within the slim CD case. Furthermore, the slim CD case 200 may include a spine 260 (shown only in edge view in FIG. 3). The spine 260 may have dimensions approximately attributable to the height and thickness of the slim CD case 200. On the cover 230 may be a reinforcement area 280, which may have a width comparable to the length of hinges 270a-b and a height comparable to the height of the slim CD case 200.

Figure 9:
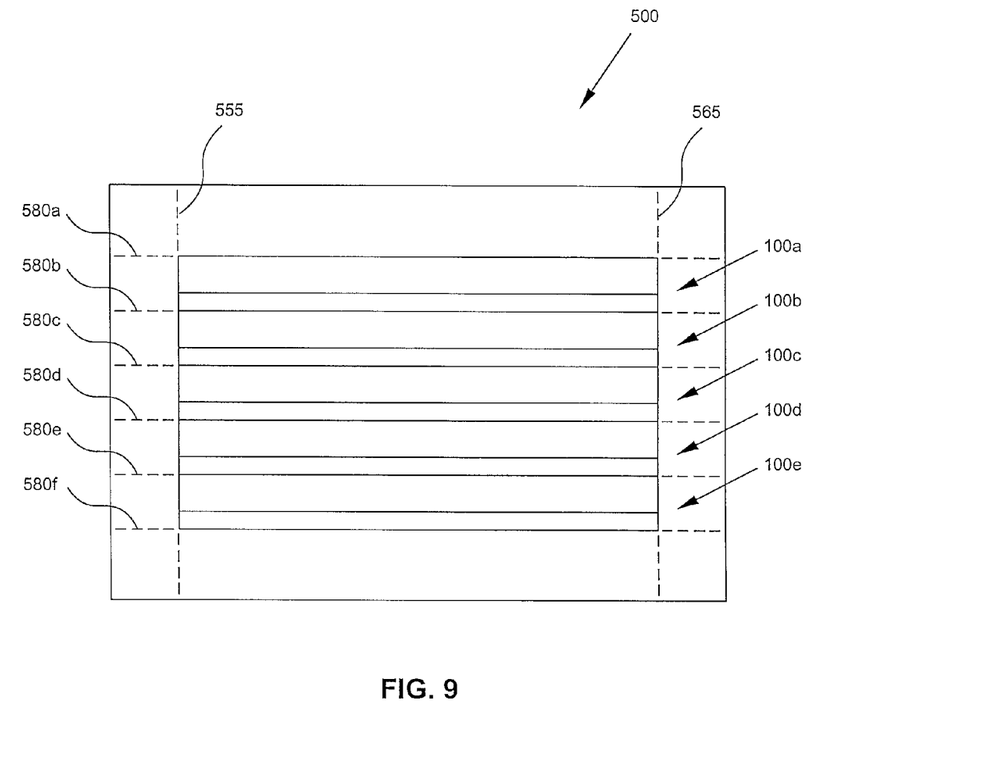
FIG. 9 depicts a top view of a plurality of slim compact disk media label apparatuses residing on a sheet, in accordance with the present invention.

Turning now to FIG. 9, which depicts a top view of a plurality of slim compact disk media label apparatuses 100a-e residing on a sheet 500. The sheet 500 may include perforations 555, 565 and 580a-f. The perforations may be dimensionally located to coincide with at least a portion of a perimeter of a label apparatus 100. A sheet may provide efficient means whereby a label apparatus may be fed through a common printer. It should be appreciated that a single label apparatus 100 may be fed through a printer. However, a sheet 500 containing multiple labels 100 separated by perforations 555, 565 and 580a-f will work better in a printer. One label prototype is provided on 4 inch by 6 inch adhesive paper designed for home printer use. A total of 5 spine labels apparatuses 100 fit comfortably on a sheet. However, there is no reason that sheet label printing cannot be accomplished with much larger paper, such as standard letter size paper, allowing for more labels to be placed on the page. In addition, a sheet 500 may be printed in relation to and using software that may facilitate placement of text or graphical images in proper position on the label apparatuses 100 as oriented on the sheet 500.

An embodiment of a method 400 of labeling a spine 260 of a slim compact disk media case 200 is now described with reference to FIGS. 1-9. The embodiment of the method 400 may include a step 410 of providing a slim compact disk media case spine label apparatus 100 comprising: a backing 50, an adhesive 30 operatively adhered to the backing 50, and a face 40, bonded to the adhesive 30 wherein a first portion 10 of the face 40 is removable from the adhesive 30 and a second portion 20 of the face 40 is preconfigured to fit substantially precisely against a spine 260 of a slim compact disk media case 200. Furthermore, the embodiment of a method 400 of labeling a spine 260 of a slim compact disk media case 200 may also include a step 420 of bending a portion 50b of the backing 50 along a line 15 corresponding to an edge between the first portion 10 of the face 40 and the second portion 20 of the face 40 so that the bend reaches approximately a 90 degree angle. In addition, another embodied method step 430 may include removing the first removable portion 10 to expose the adhesive 30, and leaving said second portion 20 of said face 40 operably attached to said bent portion 50b of said backing 50. Moreover, the embodiment of a method 400 of labeling a spine 260 of a slim compact disk media case 200 may also include a step 440 of operatively affixing the exposed adhesive 30 against a portion 280 of the slim compact disk media case 200 so that the second portion 20 of the face 40 substantially precisely fits against the spine 260 of the slim compact disk media case 200.

Still further embodied methodology 400 for labeling a spine 260 of a slim compact disk media case 200 may also include a step 415 wherein prior to removing the adhesive backing 430, there is handwriting of identifying means on the second portion of the face. Those in the art should recognize that an equivalent step may be provided wherein prior to removing the adhesive backing 430, there is printing of identifying means on the second portion of the face. Similarly, it should be recognized that additional labeling methodology 400 may include providing a slim compact disk media case spine label apparatus 100a included on a sheet 500 having several other slim compact disk media case spine label apparatuses 100b-e. Even more the method 400 for labeling a spine 260 of a slim compact disk media case 200 may also include removing a slim compact disk media case spine label apparatus 100a from the sheet 500 by tearing the apparatus 100a from the sheet 500 along perforations 555, 565 and 580a-b, corresponding to the perimeter of the label apparatus 100a prior to removing the first portion 10 of the face 40 of the label apparatus 100a.

An embodiment of a slim compact disk media case 200 spine 260 label apparatus 100 may be manufactured to be preconfigured for use in conjunction with a slim compact disk media case 200 spine 260. For example, manufacturing may include providing a backing 50. Once a backing 50 is provided then, manufacturing methodology may include affixing an adhesive 30 to the backing 40. Moreover, manufacturing of a label apparatus 100 may include operatively attaching a face 40 to the backing 50 so that the adhesive 30 is sandwiched between the face and the backing 50, wherein the face 40 may include a first removable portion 10 that may be cut along a line 15 between the first removable portion 10 and a second portion 20, said backing 50 configured to be bent at the line 15 between the first portion 10 and second portion 20 to approximately a 90 degree angle, and further wherein the second portion 20 of the face 40 dimensionally corresponds to a spine 260 of a slim compact disk media case 200.

Various component elements of a label apparatus 100 may be manufacture to have specific dimensions corresponding to a slim CD case 200. For instance, a second portion 20 of the face 40 may be manufacture to be substantially rectangular having 4⅝" by 5/32" dimensions. Even further, the manufacture of label apparatus's 100 may be mass produced wherein the backing 50 and the face 40 comprise a portion of a sheet 500. As such, manufacturing may further comprise perforating the sheet 500 portion to define perimeter dimensions of a label apparatus 100a that may be torn from the sheet 500 along the perforations 555, 565 and 580a-b. Once manufactured, a label apparatus 100 may be loosely placed in a closed slim CD case 200, such as in the reinforcement area 280, so that a user may open the case 200 and then have access to the label apparatus 100 so that t could be applied to the case. The label apparatus 100 may also be adjusted to fit spines of other types of compact disk cases. For example, the dimensions corresponding to the spine of a standard compact disk case may be adjusted to be preconfigured to correspond to a mini-disk case.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

I claim:

1. A substantially rectangular sheet having a slim compact disk media case spine label, the label for use with a corresponding slim compact disk media case having a reinforcement area, the sheet comprising:
   a backing, having a first surface and an opposed second surface;
   an adhesive, operatively adhered to the first surface of the backing;
   a face, having a first side and an opposed second side, the second side releasably bonded to the adhesive; and
   a plurality of perforated lines including:
      a first perforated line and a second perforated line, wherein the first and the second perforated lines are aligned in parallel with two opposite perimeter edges of the substantially rectangular sheet;
      at least a third perforated line and a fourth perforated line, wherein the third and fourth perforated lines are aligned in parallel with the other two opposite perimeter edges of the substantially rectangular sheet;
      wherein the configuration of the first and second perforated lines and the third and fourth perforated lines define the perimeter of at least one slim compact disk media case label; and
      a linear perforation boundary bend line positioned within the defined perimeter of the at least one slim compact disk media case label and aligned in parallel with the third and fourth perforated lines, wherein the linear perforation boundary bend line defines a first face portion and a second face portion; and
      wherein the first face portion is removable from the adhesive along the linear perforation boundary bend line exposing the first surface of a first backing portion and wherein the second face portion is preconfigured to fit substantially precisely against a transparent spine of a slim compact disk media case.

2. The apparatus of claim 1, further comprising identifying means positioned on the first side of the second face portion so that the identifying means are viewable through the transparent spine of the standard slim compact disk media case, wherein the identifying means correspond to identity of data stored on a compact disk intended to be housed by the slim compact disk media case.

3. The apparatus of claim 2, further wherein the identifying means comprise printed text.

4. The apparatus of claim 2, further wherein the identifying means comprise handwriting.

5. The apparatus of claim 1, wherein the at least one slim compact disk media case label is readily torn from the sheet along the perforated lines defining its perimeter.

6. The apparatus of claim 5, wherein, when the at least one slim compact disk media label is torn from the sheet and the first face portion is removed from the adhesive along the linear perforation boundary bend line exposing the first surface of the first backing portion, the second face portion remains operably positioned on a second backing portion.

7. The apparatus of claim 6, wherein the backing is bent at approximately a 90 degree angle along the bend line between the first backing portion and the second backing portion to facilitate the substantially precise fit of the second portion of the face against the spine of the slim compact disk media case.

8. The apparatus of claim 1, wherein the plurality of perforated lines include additional perforated lines positioned successively in parallel with the fourth and fifth perforated lines, so that the configuration of each successive additional parallel perforated line, as configured with respect to the first and second perforated lines, defines the perimeter of an additional successive slim compact disk media case label located on the sheet.

9. The apparatus of claim 8, wherein each successive slim compact disk media label located on the sheet includes a linear perforation boundary bend line positioned within the defined perimeter of each successive slim compact disk media case label and aligned in parallel with the third and fourth perforated lines, wherein the linear perforation boundary bend lines define a first face portion and a second face portion of each successive slim compact disk media case label, and wherein the first face portion of each successive slim compact disk media case label is removable from the adhesive along the linear perforation boundary bend line exposing the first surface of a first backing portion and wherein the second face portion of each successive slim compact disk media case label is preconfigured to fit substantially precisely against a transparent spine of a slim compact disk media case.

10. A method of labeling a spine of a slim compact disk media case, said method comprising:
    providing a substantially rectangular sheet having:
        a backing, having a first surface and an opposed second surface;
        an adhesive, operatively adhered to the first surface of the backing;
        a face, having a first side and an opposed second side, the second side releasably bonded to the adhesive; and
        a plurality of perforated lines including:
            a first perforated line and a second perforated line, wherein the first and the second perforated lines are aligned in parallel with two opposite perimeter edges of the substantially rectangular sheet;
            at least a third perforated line and a fourth perforated line, wherein the third and fourth perforated lines are aligned in parallel with the other two opposite perimeter edges of the substantially rectangular sheet;
            wherein the configuration of the first and second perforated lines and the third and fourth perforated lines define the perimeter of at least one slim compact disk media case label; and a linear perforation boundary bend line positioned within the defined perimeter of the at least one slim compact disk media case label and aligned in parallel with the third and fourth perforated lines,
            wherein the linear perforation boundary bend line defines a first face portion and a second face portion; and wherein the first face portion is removable from the adhesive along the linear perforation boundary bend line exposing the first surface of a first backing portion and wherein the second face portion is preconfigured to fit substantially precisely against a transparent spine of a slim compact disk media case;
    providing identifying means positioned on the first side of the second face portion so that the identifying means are viewable through a transparent spine of a standard slim compact disk media case;
    tearing the at least one slim compact disk media case label from the sheet along the perforated lines defining its perimeter;
    bending the second backing portion along the linear perforation boundary bend line corresponding to an edge between the first face portion and the second face portion so that the bend reaches approximately a 90 degree angle;
    removing the first face portion to expose the adhesive bonded to the first surface of the first backing portion, and leaving said second face portion operably attached to a second backing portion; and
    operatively affixing the exposed adhesive against a reinforcement area of the slim compact disk media case so that the first side of the second face portion substantially precisely fits against the spine of the slim compact disk media case.

11. The method of claim 10, wherein the identifying means are printed on the first side of the second face portion.

12. The method of claim 10, wherein the identifying means are hand-written on the first side of the second face portion.

13. A method of manufacturing a substantially rectangular label sheet apparatus to be preconfigured for use in conjunction with a slim compact disk media case spine, said method comprising:
    providing a backing, having a first surface and an opposed second surface;
    affixing an adhesive to the first surface of the backing;
    operatively attaching a face to the backing so that the adhesive is sandwiched between the face and the backing; and
    perforating the backing to have a plurality of perforated lines including:
        a first perforated line and a second perforated line, wherein the first and the second perforated lines are aligned in parallel with two opposite perimeter edges of the substantially rectangular label sheet;
        at least a third perforated line and a fourth perforated line, wherein the third and fourth perforated lines are aligned in parallel with the other two opposite perimeter edges of the substantially rectangular label sheet;
        wherein the configuration of the first and second perforated lines and the third and fourth perforated lines define the perimeter of at least one slim compact disk media case label; and
        a linear perforation boundary bend line positioned within the defined perimeter of the at least one slim compact disk media case label and aligned in parallel with the third and fourth perforated lines, wherein the linear perforation boundary bend line defines a first face portion and a second face portion;
        wherein the first face portion is removable from the adhesive along the linear perforation boundary bend line exposing the first surface of a first backing portion and wherein the second face portion is preconfigured to fit substantially precisely against a transparent spine of a slim compact disk media case.

14. The method of claim 13, further wherein the second face portion is substantially rectangular having 4 and 5/8" by 5/32" dimensions.

* * * * *